United States Patent [19]

Tanaka et al.

[11] Patent Number: 4,904,578
[45] Date of Patent: Feb. 27, 1990

[54] LIGHT ABSORBING DYE FOR PHOTOGRAPHY

[75] Inventors: Akira Tanaka; Koichi Sumioka, both of Nagaokakyo, Japan

[73] Assignee: Mitsubishi Paper Mills, Ltd., Tokyo, Japan

[21] Appl. No.: 303,233

[22] Filed: Jan. 30, 1989

[30] Foreign Application Priority Data

Feb. 1, 1988 [JP] Japan .................................. 63-21483
Feb. 1, 1988 [JP] Japan .................................. 63-21484

[51] Int. Cl.$^4$ ............................................. G03C 1/84
[52] U.S. Cl. .................................... 430/507; 430/512; 430/522
[58] Field of Search .......................... 430/507, 512, 522

[56] References Cited

U.S. PATENT DOCUMENTS

| | | | |
|---|---|---|---|
| 3,627,532 | 12/1971 | Depoorter et al. | 430/522 |
| 4,187,225 | 2/1980 | Bader et al. | 430/522 |
| 4,500,631 | 2/1985 | Sakamoto et al. | 430/522 |
| 4,542,085 | 9/1985 | Takahashi et al. | 430/522 |

*Primary Examiner*—Hoa Van Le
*Attorney, Agent, or Firm*—Cushman, Darby & Cushman

[57] ABSTRACT

This invention provides a light absorbing dye for silver halide photographic light-sensitive material which is represented by the following formula [I] or [II]:

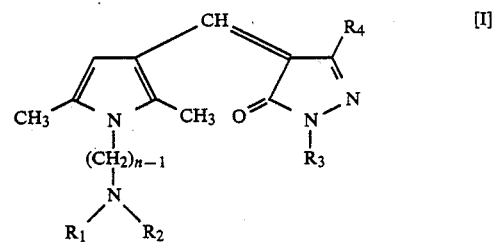

wherein $R_1$ and $R_2$ which may be identical or different each represents a substituted or unsubstituted alkyl group and may link to each other to form a ring, $R_3$ represents an alkyl group substituted with at least one sulfo group or an aryl group substituted with at least one sulfo group, $R_4$ represents a substituted or unsubstituted alkyl group, a substituted or unsubstituted aryl group, a carboxy group or an alkoxycarbonyl group, and n represents an integer of 1–4;

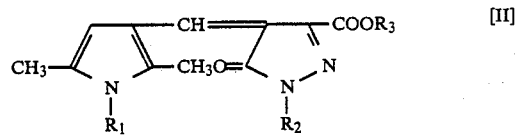

wherein $R_1$ represents an alkyl group or an aryl group, $R_2$ represents an aryl group substituted with sulfo group and $R_3$ represents an alkyl group.

4 Claims, No Drawings

LIGHT ABSORBING DYE FOR PHOTOGRAPHY

BACKGROUND OF THE INVENTION

The invention relates to a light absorbing dye for photography and more particularly it relates to a dye useful as a light absorbing dye to be used for silver halide photographic light-sensitive materials.

It is well known to improve the sharpness of images formed in silver halide photographic light-sensitive materials by absorbing the harmful reflected light, scattered light and diffused light at light-sensitive emulsion layer or undesired reflected light from interface between emulsion layer and a support and from the back side of the support to prevent irradiation and halation.

It is also well known to control the spectral composition of incident light into the emulsion layer by providing a colored layer (a filter layer) on the emulsion layer or between emulsion layers when a plurality of emulsion layers are present as in multi-layer color photographic light-sensitive materials.

If is natural that dyes to be present in a light-sensitive emulsion layer, a backcoat layer or a filter layer or between the emulsion layer and a support to prevent irradiation and halation must not show changes with time such a discoloration during preparation of solutions or production or storage of light-sensitive emulsions and furthermore, such dyes must not have adverse effects on photographic characteristics such as photographic fog and desensitization.

Furthermore, complete and rapid decoloration must occur or the dyes must be dissolved out and removed from the light-sensitive material during developing treatment. Preferably, these dyes are of decoloration type and the decolored dyes can be dissolved out and do not color a processing solution. Besides, they must have spectral absorption characteristics corresponding to the respective object and have effects of preventing irradiation and halation and an effect of spectral filtering.

Although there have been proposed many dyes, only a few of them are satisfactory in decoloration, dissolving-out property and photographic characteristics.

SUMMARY OF THE INVENTION

Accordingly, the object of this invention is to provide light absorbing dyes for photography which satisfy the above conditions and have excellent effects of preventing irradiation and halation and filter effect.

DESCRIPTION OF THE INVENTION

As a result of the inventor's extensive researches, it has been found that a dye represented by the following formula [I] or [II] is an excellent dye which satisfies the above conditions.

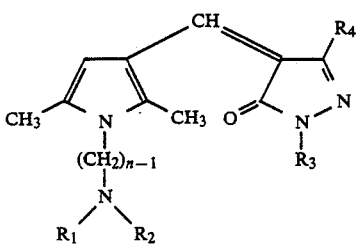

wherein $R_1$ and $R_2$ may be the same or different and each represents a substituted or unsubstituted alkyl group (for example, methyl, ethyl, n-propyl, i-propyl, n-butyl, t-butyl, 2-hydroxyethyl, 2-methoxyethyl, 2-ethylsulfonamidoethyl, 2-methylthioethyl, etc.) and may link to each other to form a ring (for example, pyrrolidine, pyrrolidinone, piperidine, piperazine, morpholine, etc.); $R_3$ represents an alkyl group substituted with at least one sulfo group (for example, 2-sulfoethyl, 3-sulfopropyl, 2-hydroxy-3-sulfopropyl, 4-sulfobutyl, 3-sulfobutyl, etc.) or an aryl group substituted with at least one sulfo group (for example, 3-sulfophenyl, 4-sulfophenyl, 4-chloro-3-sulfophenyl, 4-methyl-2-sulfophenyl, 3-methoxy-4-sulfophenyl, 2,5-disulfophenyl, etc.); $R_4$ represents a substituted or unsubstituted alkyl group (for example, methyl, ethyl, n-propyl, i-propyl, n-butyl, t-butyl, carboxymethyl, benzyl, etc.), a substituted or unsubstituted aryl group (for example, phenyl, 2-methylphenyl, 3-chlorophenyl, 4-methoxyphenyl, 4-cyanophenyl, 4-carboxyphenyl, 4-ethoxycarbonylphenyl, 3-sulfophenyl, 3,5-disulfophenyl, etc.), a carboxy group or an alkoxycarbonyl group (for example, methoxycarbonyl, ethoxycarbonyl, n-propoxycarbonyl, etc.); and n represents an integer of 1–4.

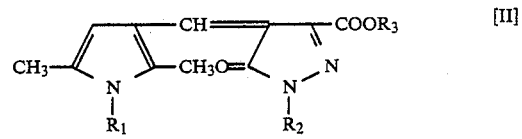

wherein $R_1$ represents an alkyl group (for example, lower alkyl groups such as methyl, ethyl, n-propyl, i-propyl, n-butyl and t-butyl and these alkyl groups may be substituted with hydroxy group, alkoxy group such as methoxy and ethoxy, cyano group, and alkoxycarbonyl group such as methoxycarbonyl and ethoxycarbonyl), an aryl group (for example, a phenyl group which may be substituted with lower alkyl group, hydroxy group, alkoxy group, cyano group, or alkoxycarbonyl group as mentioned-above for $R_1$, halogen atom such as chlorine and bromine, carbamoyl group, sulfamoyl group, substituted amino group such as methylamino, dimethylamino and diethylamino or carboxy group); $R_2$ represents an aryl group substituted with sulfo group (for example, 3-sulfophenyl, 4-sulfophenyl, 2,5-disulfophenyl, 3,5-disulfophenyl, etc. and these aryl groups may have other substituents as mentioned-above for $R_1$); and $R_3$ Represents an alkyl group (for example, lower alkyl group as mentioned-above for $R_1$). The dye represented by the above general formula [I] or [II] may be in the form of an alkali metal salt such as potassium salt, sodium salt, etc. or an ammonium salt such as triethyl ammonium, pyridinium, etc.

Silver halide photographic light-sensitive materials colored with the dye of this invention represented by the above general formula have a wide absorption band in the objective wavelength range with substantially no undesired side absorptions in other wavelength range. Further, the dyes of this invention all have a high molecular extinction coefficient and can exhibit sufficient effects of preventing irradiation and halation and filter effect with a small addition amount without giving adverse effects on photographic characteristic such as fogging and desensitization. in addition, since the dyes are completely and rapidly decolored and dissolved out from light-sensitive materials after developing treatment, there remain no dyes in the final photographic image which are added for the above purposes and besides there occur no stains due to recoloration of the decolored dyes nor recoloration due to coloration of development processing solution. Furthermore, the dyes of this invention have advantages that they show no changes such as discoloration during preparation of dye solutions and are not influenced by external conditions such as wet heat during preparation of light-sensitive emulsion and subsequent storage and are stable.

Typical examples of the dyes represented by the above formula [I] are enumerated below.

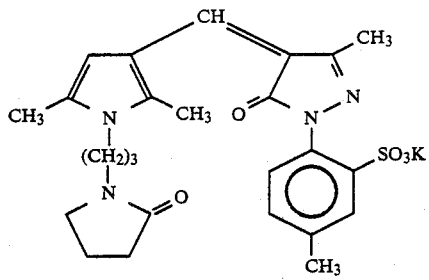
Dye I-(5)

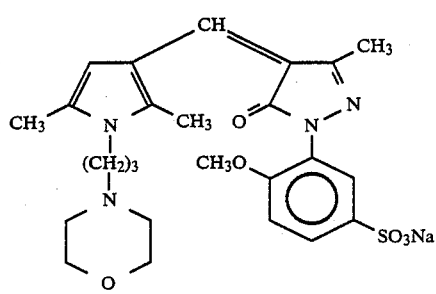
Dye I-(1)

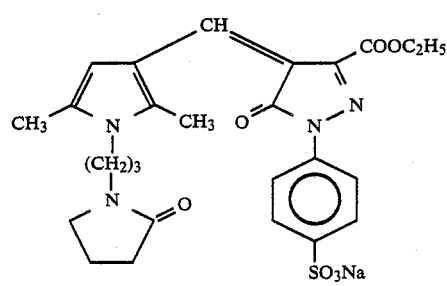
Dye I-(6)

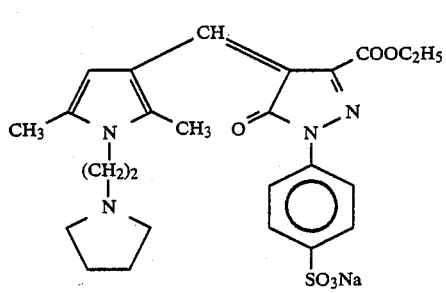
Dye I-(2)

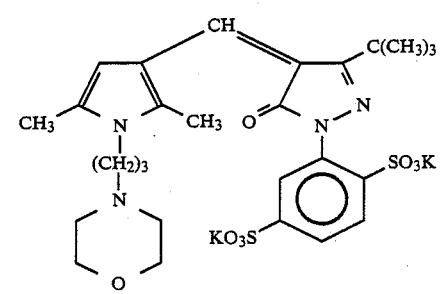
Dye I-(7)

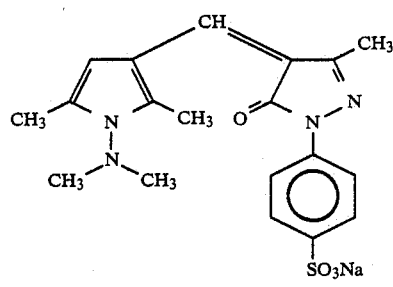
Dye I-(3)

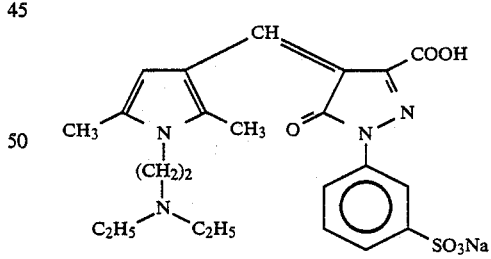
Dye I-(8)

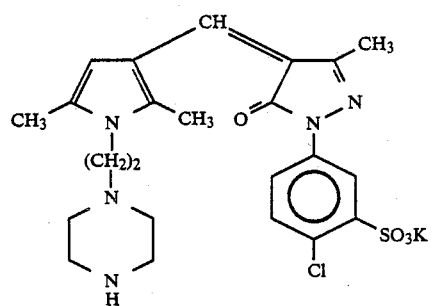
Dye I-(4)

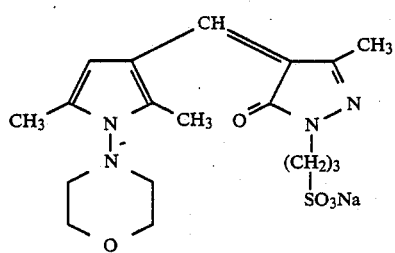
Dye I-(9)

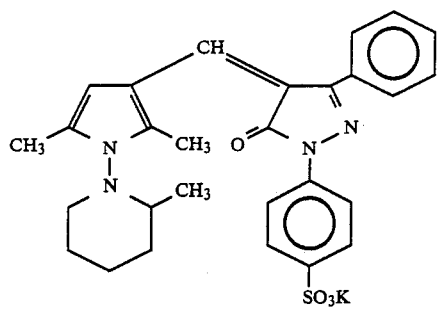

Dye I-(10)

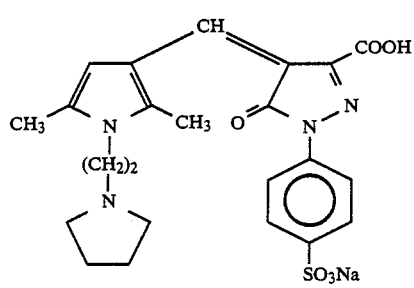

Dye I-(11)

Typical examples of the dyes represented by the above formula [II] are enumerated below.

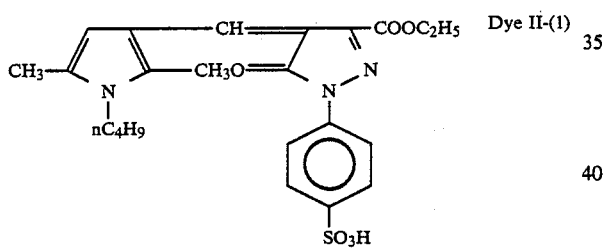

Dye II-(1)

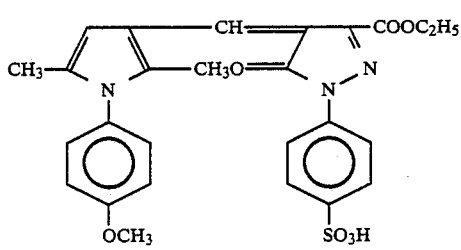

Dye II-(2)

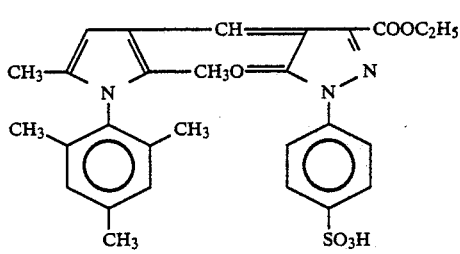

Dye II-(3)

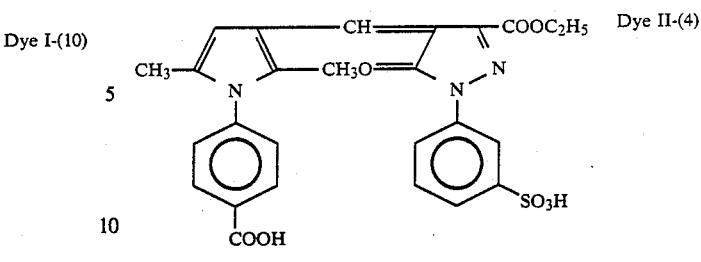

Dye II-(4)

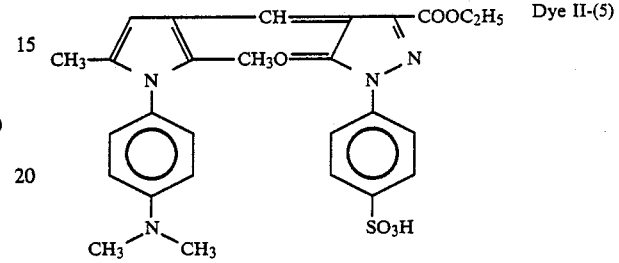

Dye II-(5)

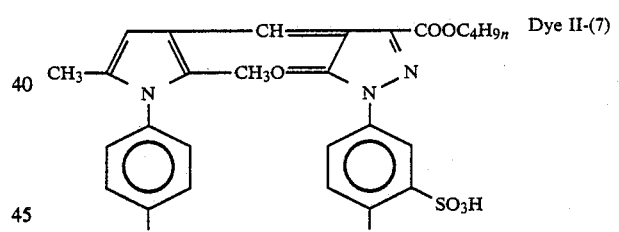

Dye II-(6)

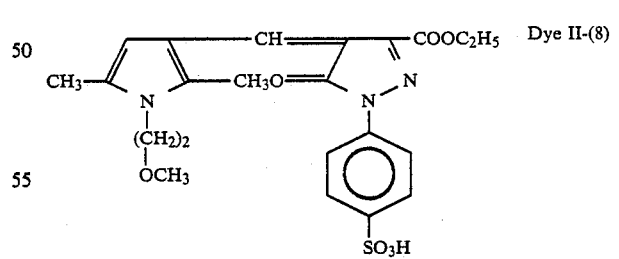

Dye II-(7)

Dye II-(8)

Representative examples of preparation of dyes represented by the formula [I] and [II] are shown below.

PREPARATION OF DYE I-(3)

19.4 g of 1,1-dimethylhydrazine and 41.5 g of acetonylacetone were dissolved in 200 ml of benzene and thereto was gradually added 50 ml of acetic acid, followed by refluxing under heating for 5 hours in an apparatus designed for the continuous removal of water while distilling off water produced. Then, benzene was distilled off to obtain 39.6 g of light purplish brown fraction having a boiling point of 150.0°–160.0° C.

66.6 g of phosphorus oxychloride was gradually and dropwise added to 85.0 ml of dimethylformamide kept at lower than 20° C. with stirring. After completion of addition, the mixture was stirred at the same temperature for 5 minutes and then thereto was gradually and dropwise added 39.6 g of the above-obtained 1-dimethylamino-2,5-dimethylpyrrole over a period of about 30 minutes. After completion of the addition, stirring was effected at the same temperature for 15 minutes. Then, temperature was elevated to 35°–40° C. and stirring was continued for further 30 minutes. Then, the reaction mixture was poured on 450 ml of ice water and was made strongly alkaline with 40% aqueous sodium hydroxide solution. The precipitated oily product was extracted twice with 300 ml of benzene and extracts were combined and dried over sodium sulfate. After distilling off benzene, the residue was distilled under reduced pressure to obtain 28.7 g of nearly colorless fraction having a boiling point of 110.0°–112.0° C./4 mmHg.

400 ml of 2-methoxy ethanol was added to 27.2 g of the thus obtained 3-formyl-1-dimethylamino-2,5-dimethoxypyrrole and 41.6 g of 3-methyl-1-(4-sulfophenyl)-5-pyrazolone and to the mixture was further added 22.4 g of sodium acetate trihydrate, followed by refluxing under heating for 1 hour. After distilling off the solvent, to the residue was added 350 ml of hot ethanol and this was well stirred and the precipitated dye was collected by filtration. The dye was washed with ethanol and then dried to obtain 61.2 g of ocher crystalline powder having a melting point of 300° C. or higher. Aqueous solution thereof had an absorption maximum of 420 nm.

PREPARATION OF DYE II–(5)

13.6 g of N,N-dimethyl-p-phenylenediamine was mixed with 13.5 g of acetonylacetone and the mixture was heated at 150°–160° C. for 4 hours. The solidified reaction mixture was recrystallized from ethanol and dried to obtain 20.6 g of white or light brown flaky crystal of m.p. 92.0°–93.5° C.

20.6 g of phosphorus oxychloride was gradually and dropwise added to 26.4 ml of dimethylformamide kept at lower than 20° C. with stirring. After completion of addition, the mixture was stirred at the same temperature for 5 minutes and then thereto was gradually and dropwise added a solution of 19.3 g of the above-obtained 1-(4-dimethylaminophenyl)-2,5-dimethylpyrrole in 100 ml of dimethylformamide over a period of about 30 minutes. After completion of the addition, stirring was effected at the same temperature for 15 minutes. Then, temperature was elevated to 35°–40° C. and stirring was continued for further 30 minutes. Then, the reaction mixture was poured on 600 g of ice water and was made strongly alkaline with 40% aqueous sodium hydroxide solution. The precipitated solid was collected by filtration, washed with water, recrystallized from ethanol and dried to obtain 16.8 g of white or light brown crystalline powder of m.p. 124.0°–125.0° C.

50 ml of 2-methoxy ethanol was added to 2.4 g of the thus obtained 3-formyl-1-(4-dimethylaminophenyl)-2,5-dimethylpyrrole and 3.34 g of 3-ethoxycarbonyl-1-(4-sulfophenyl)-5-pyrazolone sodium salt and to the mixture was further added 1.36 g of sodium acetate trihydrate, followed by refluxing under heating for 10 minutes. After distilling off the solvent, to the residue was added 10 ml of ethanol and this was well stirred and the precipitated dye was collected by filtration. The dye was washed with ethanol and then dried to obtain 1.80 g of orange colored crystalline powder having a melting point of 273.0° C. (dec.) [sodium salt of dye II–(5)]. Aqueous solution thereof had an absorption maximum of 438 nm.

Other dyes represented by the above formulas [I] and [II] can also be easily prepared in accordance with the above preparation examples.

In order to add the dyes of this invention to silver halide photographic emulsion or protective colloid solution, they may be added in the form of an aqueous solution, a solution thereof in methanol, ethanol, cellosolves, glycols, dimethylformamide, dimethyl-sulfoxide, pyridine, etc. or a mixed solution in these organic solvent and water to emulsion layer, backcoat layer, subbing layer, inter layer, protective layer, ultraviolet absorbing layer, etc.

Amount of these dyes to be added varies depending on the photographic layers to which they are added, but generally 5–1,000 mg per 1 $m^2$ of the light-sensitive material.

Silver halide photographic emulsion used in this invention includes, for example silver chloride, silver bromide, silver chlorobromide, silver iodobromide, silver chloroiodobromide, etc.

These silver halide emulsions may be subjected to spectral sensitization with the commonly used cyanine, merocyanine dyes and the like.

Further, the silver halide emulsions may contain additives such as basic mordants, e.g., polymers containing amino group or ammonium group and polymers having nitrogen-containing heterocyclic ring, stabilizers and their precursors, surfactants, hardeners, ultraviolet absorbers, fluorescent brighteners, developing agent and their precursors, etc. They may also contain color couplers or their dispersants when the silver halide emulsion is used for color light-sensitive materials.

As protective colloids for silver halide emulsions, there may be used gelatin, gelatin derivatives such as phthalated or malonated gelatins, water soluble polymers such as polyvinyl alcohol and polyvinyl pyrrolidone. Furthermore, plastisizers for dimension stability and latex polymers may also be added to the emulsions.

The silver halide emulsions may be coated on various supports such as baryta paper, resin coated paper, synthetic paper, natural or synthetic high polymer films such as cellulose triacetate or polyester films.

The following examples further illustrate this invention.

EXAMPLE 1

1.55 g of gelatin was added to 15.0 ml of water to swell the gelatin and thereafter was heated to 40° C. to dissolve the gelatin. To the resulting gelatin solutions were added each of aqueous solutions of the dyes of this invention and the following comparative dyes ($2.0 \times 10^{-4}$ mol/2.0 ml of water), a hardener and a surfactant and water was further added to make up 20.0 ml. Each of these colored solutions was coated on a subbed polyester film base at a coverage of 85 g/$m^2$, heated at 50.0° C. for 24 hours and then cut into a rectangle of $8.0 \times 11.5$ $cm^2$, which was employed as a sample.

The sample was dipped in the developer D-72 at 30.0° C. for 5 seconds and 15 seconds, then washed with running water for 10 seconds, put between filter papers to absorb water drops and dried. This was employed as treated sample. Each of the samples and the treated samples were measured for density at five points by Macbeth transmission densitomer TD-504 and average value thereof was employed as the density of each sample. The results are shown in Table 1.

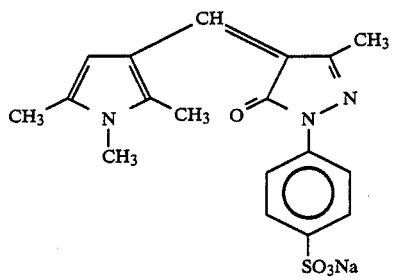

Comparative dye A

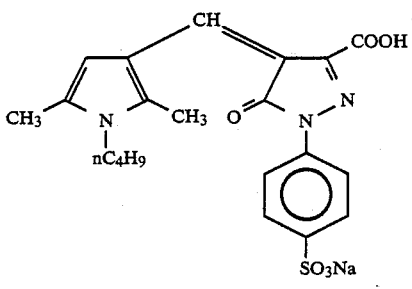

Comparative dye B

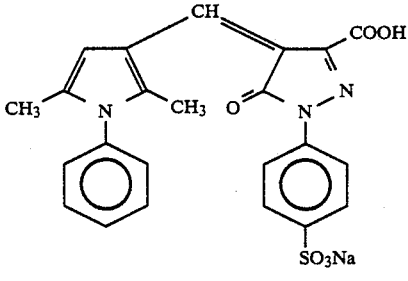

Comparative dye C

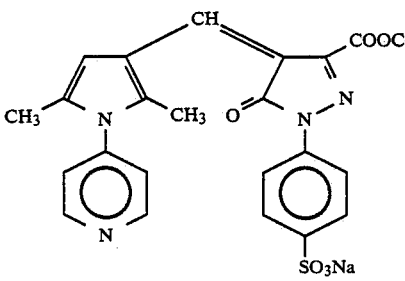

Comparative dye D

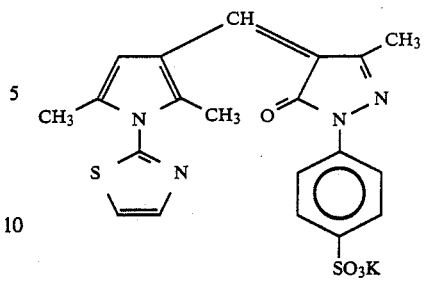

Comparative dye E

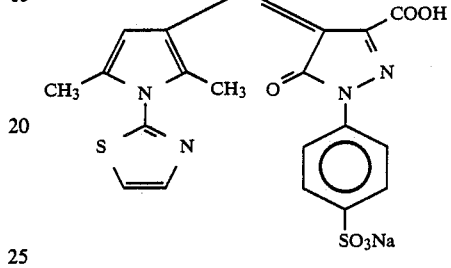

Comparative dye F

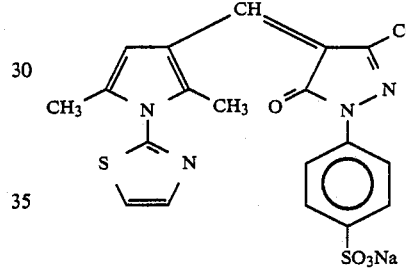

Comparative dye G

TABLE 1

| Dye No. | Initial density | Density after treatment | |
|---|---|---|---|
| | | 5 sec. | 15 sec. |
| I-(1) | 0.40 | 0.03 | 0.03 |
| I-(2) | 0.32 | 0.03 | 0.03 |
| I-(3) | 0.32 | 0.03 | 0.03 |
| I-(4) | 0.36 | 0.03 | 0.03 |
| I-(5) | 0.35 | 0.03 | 0.03 |
| I-(6) | 0.40 | 0.03 | 0.03 |
| I-(7) | 0.40 | 0.03 | 0.03 |
| I-(8) | 0.39 | 0.03 | 0.03 |
| I-(9) | 0.31 | 0.03 | 0.03 |
| I-(10) | 0.31 | 0.03 | 0.03 |
| I-(11) | 0.45 | 0.03 | 0.03 |
| A | 0.34 | 0.04 | 0.03 |
| B | 0.20 | 0.03 | 0.03 |
| C | 0.20 | 0.03 | 0.03 |
| D | 0.25 | 0.04 | 0.04 |
| E | 0.23 | 0.03 | 0.03 |
| F | 0.15 | 0.03 | 0.03 |
| G | 0.14 | 0.04 | 0.03 |
| No addition | 0.03* | 0.03 | 0.03 |

*Density of base

EXAMPLE 2

Samples were prepared in the same manner as in Example 1 using the dyes of this invention and the comparative dyes as shown in the following table and density of the samples was measured in the same manner as in Example 1. The results are shown in Table 2.

Dyes were in this example:

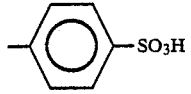

| R₁ | R₂ | X | | |
|---|---|---|---|---|
| | | —COOR₃* | —CH₃ | —COOH |
| —nC₄H₉ | ―⟨ ⟩―SO₃H | Dye II-(1) | Comparative dye (A) | Comparative dye (B) |
| ―⟨ ⟩―OCH₃ | " | Dye II-(2) | Comparative dye (C) | Comparative dye (D) |
| 2,4,6-(CH₃)₃C₆H₂― | " | Dye II-(3) | Comparative dye (E) | Comparative dye (F) |
| ―⟨ ⟩―COOH | ―⟨ ⟩―SO₃H (meta) | Dye II-(4) | Comparative dye (G) | Comparative dye (H) |
| ―⟨ ⟩―N(CH₃)₂ | ―⟨ ⟩―SO₃H | Dye II-(5) | Comparative dye (I) | Comparative dye (J) |
| ―⟨ ⟩―SO₂NH₂ | CH₃O―⟨ ⟩―SO₃H | Dye II-(6) | Comparative dye (K) | Comparative dye (L) |
| ―⟨ ⟩―COOC₂H₅ | ―⟨ ⟩(Cl)―SO₃H | Dye II-(7) | Comparative dye (M) | Comparative dye (N) |
| —(CH₂)₂OCH₃ | ―⟨ ⟩―SO₃H | Dye II-(8) | Comparative dye (O) | Comparative dye (P) |
| | | This invention | Outside the invention | Outside the invention |

*R₃ is an alkyl group.

TABLE 2

| Dye No. | Initial density | Density after treatment | |
|---|---|---|---|
| | | 5 sec. | 15 sec. |
| II-(1) | 0.67 | 0.03 | 0.03 |
| (A) | 0.35 | 0.04 | 0.03 |
| (B) | 0.21 | 0.03 | 0.03 |
| II-(2) | 0.58 | 0.03 | 0.03 |
| (C) | 0.32 | 0.03 | 0.03 |

TABLE 2-continued

| Dye No. | Initial density | Density after treatment | |
|---|---|---|---|
| | | 5 sec. | 15 sec. |
| (D) | 0.51 | 0.04 | 0.03 |
| II-(3) | 0.51 | 0.03 | 0.03 |
| (E) | 0.31 | 0.10 | 0.04 |
| (F) | 0.48 | 0.05 | 0.03 |
| II-(4) | 0.59 | 0.03 | 0.03 |

TABLE 2-continued

| Dye No. | Initial density | Density after treatment 5 sec. | 15 sec. |
|---|---|---|---|
| (G) | 0.34 | 0.03 | 0.03 |
| (H) | 0.50 | 0.04 | 0.03 |
| II-(5) | 0.64 | 0.03 | 0.03 |
| (I) | 0.37 | 0.06 | 0.04 |
| (J) | 0.40 | 0.04 | 0.03 |
| II-(6) | 0.59 | 0.03 | 0.03 |
| (K) | 0.26 | 0.03 | 0.03 |
| (L) | 0.46 | 0.04 | 0.03 |
| II-(7) | 0.60 | 0.03 | 0.03 |
| (M) | 0.31 | 0.03 | 0.03 |
| (N) | 0.50 | 0.04 | 0.03 |
| II-(8) | 0.62 | 0.03 | 0.03 |
| (O) | 0.35 | 0.03 | 0.03 |
| (P) | 0.23 | 0.03 | 0.03 |
| No addition | 0.03* | 0.03 | 0.03 |

*Density of base

As is clear from Tables 1 and 2, the dyes of this invention had high initial density and besides difference between the initial density and the density after treatment was great. That is, the dyes of this invention are superior in decoloration and dissolving-out property.

EXAMPLE 3

A 1% aqueous solution of each of the dyes of this invention was added to a 10% aqueous solution of gelatin so that when the mixture was coated at a coverage of 85 g/m$^2$, the layer had an optical density of about 1.0 and then 5 ml of a 10% aqueous solution of saponin and 1.5 ml of 10% formalin were added to 150 ml of the aqueous solution of gelatin to obtain a colored aqueous gelatin solution. This gelatin solution was coated in the same manner as in Example 1 to obtain a hardened coating layer of 1.0 in optical density. On this coating layer was coated a pure silver bromide emulsion and this was developed with a developer of the following composition at 20° C. for 90 seconds and thereafter was subjected to fixing, washing with water and drying in the conventional manner. Optical density of thus treated films was measured by the method employed in Example 1. The densities of the treated samples containing the dyes of this invention were all 0.03. (Base density was 0.03.)

| Composition of the developer | |
|---|---|
| Metol | 3 g |
| Sodium sulfite | 45 g |
| Hydroquinone | 12 g |
| Sodium carbonate (monohydrate) | 80 g |
| Potassium bromide | 2 g |
| Water was added to make up 1 l. | |

In the case of the samples containing the dyes of this invention, there occurred no changes with time such as discoloration during preparation of aqueous solution of the dye and preparation of emulsion and storage thereof, there were no adverse effects on photographic characteristics such as fogging and desensitization and extremely superior effect of preventing halation was exhibited.

What is claimed is:

1. A silver halide photographic light-sensitive material which comprises a support and, provided thereon, at least one photographic layer, said photographic layer containing a light absorbing dye represented by the following formula [I] or [II]

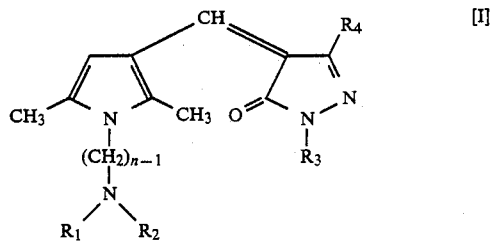

wherein $R_1$ and $R_2$ which maybe identical or different each represents a substituted or unsubstituted alkyl group and may link to each other to form a ring, $R_3$ represents an alkyl group substituted with at least one sulfo group or an aryl group substituted with at least one sulfo group, $R_4$ represents a substituted or unsubstituted alkyl group, a substituted or unsubstituted aryl group, a carboxy group or an alkoxycarbonyl group, and n represents an integer of 1-4;

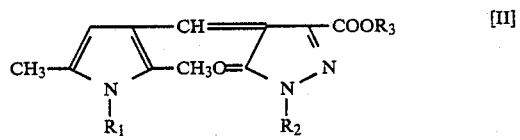

wherein $R_1$ represents an alkyl group or an aryl group, $R_2$ represents an aryl group substituted with sulfo group and $R_3$ represents an alkyl group.

2. A silver halide photographic light-sensitive material according to claim 1 wherein the dye is in the form of an alkali metal salt or an ammonium salt.

3. A silver halide photographic light-sensitive material according to claim 1 wherein the dye is contained in at least one of silver halide emulsion layer, subbing layer, intermediate layer, protective layer, ultraviolet absorbing layer and backcoating layer.

4. A silver halide photographic light-sensitive layer according to claim 1 wherein amount of the dye is 5-1,000 mg/m$^2$.

* * * * *